UNITED STATES PATENT OFFICE.

GUSTAV SCHWANHAUSSER, OF NUREMBERG, BAVARIA.

IMPROVEMENT IN COLORED COPYING-PENCILS.

Specification forming part of Letters Patent No. 169,195, dated October 26, 1875; application filed April 5, 1875.

*To all whom it may concern:*

Be it known that I, GUSTAV SCHWANHAUSSER, of Nuremberg, Germany, have invented, made, and applied to use certain new and useful Improvements in Copying-Ink Pencils and compounds from which to make them, whereof the following is a specification:

The object of my invention is to produce a soluble colored or coloring compound, from which pencils may be made, and the solubility of which will remain after the compound has become thoroughly dry.

My said invention may be said to consist, first, in a compound of nitrate of oxide of chromium (or a chromate) with a suitable vegetable coloring agent of a soluble nature; second, in copying-ink pencils, made or formed from such compound.

To enable others lawfully to make and practice my invention, I will proceed to describe the same.

Take ten pounds of best chip logwood, and simmer the same in one hundred pounds of pure water until the decoction is evaporated to one hundred pounds. Next heat the liquid in a china vase to the boiling-point, and add small quantities of the nitrate of oxide of chromium (prepared as hereinafter specified) until the bronze precipitate first appearing has again dissolved with a deep bluish-black color. The liquid is then evaporated upon a water-bath to the consistency of thick sirup, after which there should be added about one part of finest elutriated fat clay to, say, three or three and one-half parts of the liquid or extract. To impart to the pencils made from the compound more or less hardness or density, and also the better to insure a perfect adhesion of the plastic mass, there should be added a small quantity of slime of gum-tragacanth.

The nitrate of oxide of chromium, or chromate, ($Cr_2O_3 3NO_5 + 18HO$,) I prepare as follows: I take twenty pounds of chrome-alum, ($KOSO_3 Cr_2O_3 + 3SO_3 + 24HO$,) and dissolve it in two hundred pounds of cooking-water, and gradually add to the solution an equal amount of another (prepared in like manner) of carbonate of soda, ($NaOCO_2$,) until all the hydrate of oxide of chromium ($Cr_2O_3 HO$) is precipitated. After the settling of the bluish-green precipitate I remove the liquid, and repeatedly wash the precipitates obtained, until the water running off is free from sulphate of potassa and soda. ($KOSO_3 NaOSO_3$.) I ascertain this by adding to the water a little of the soured solution of chloride of barium, which produces no precipitate therein when the water is thus freed. Then I add to the above precipitates collected upon a filter pure nitric acid ($NO_5$) thinned with an equal quantity of water, and this is subjected to the action of heat until there is found a surplus of hydrate of oxide of chromium. In this way I procure a perfectly-saturated solution of nitrate of oxide of chromium without an excess of nitric acid, ($NO_5$,) which excess would have a disadvantageous effect upon the logwood extract during the evaporation, producing a dirty reddish, instead of a very deep blue, color.

This chromate I deem far superior to others for the production of the plastic mass or compound, as others crystallize in drying, and thus cause the pencils in drying to crumble. Another advantage of the solution of nitrate of oxide of chromium or chromate is, that in the course of preparation there results no basic nitrate of oxide of chromium, which is the case with most other chromates; and, besides, such basic salts would precipitate a great part of the logwood extract instead of producing solutions.

Among the many advantages of the pencils made from the plastic mass or compound I have described I may mention, first, they allow of a copy to be taken of writing executed with them in the same manner as usual (by impression) in the case of writing done with copying-ink, and such copy is indelible by light; second, their writing does not lose or lessen its copying capability by exposure to light and air; third, though adapted for giving a copy by impression when done with a dry pencil and paper, the writing, if either the paper be slightly moistened, or the pencil wet, as with the tongue, will instantly penetrate so deeply in the paper that it cannot be wiped out with water, nor afterward copied by impress, and the writing dries so quickly that the paper may be folded immediately without fear of blotting; fourth, the writing is unaffected by corrosive alkalies or oxalic acid, the enemy of all gallic inks, and even thinned sulphuric acid will not render it less legible, though imparting a reddish tinge; fifth, the pencils are so economical in cost as to be within the means of all, while they are adapted for use in wood like the ordinary lead-pencils, and, without wood, for all kinds of pencil-cases; they also write as well and give as black lines as the graphite or lead pencils.

I also make pencils of other colors than black by substituting other vegetable coloring agents for the logwood, using the same process and chromates or salts as used for black.

I do not claim the use of aniline for copying-pencils; but

What I claim as my invention, and desire to secure by Letters Patent, is—

1. As a mordant or vehicle for copying-pencils, the compound of nitrate of oxide of chromium and fine clay, united by a little gum, substantially as specified.

2. Copying-pencils, made of the compound of nitrate of oxide of chromium with a suitable vegetable coloring agent and fine clay, united by a little gum, substantially as described.

In testimony that I claim the foregoing I have hereunto set my hand this 15th day of March, 1875.

GUSTAV SCHWANHAUSSER.

Witnesses:
　J. N. R. BARTHELMASS,
　W. FUSCHER.